C. M. DAILEY.
MUD HOLE ATTACHMENT FOR AUTOMOBILES.
APPLICATION FILED MAR. 23, 1917.
1,235,557.
Patented Aug. 7, 1917.
2 SHEETS—SHEET 1.
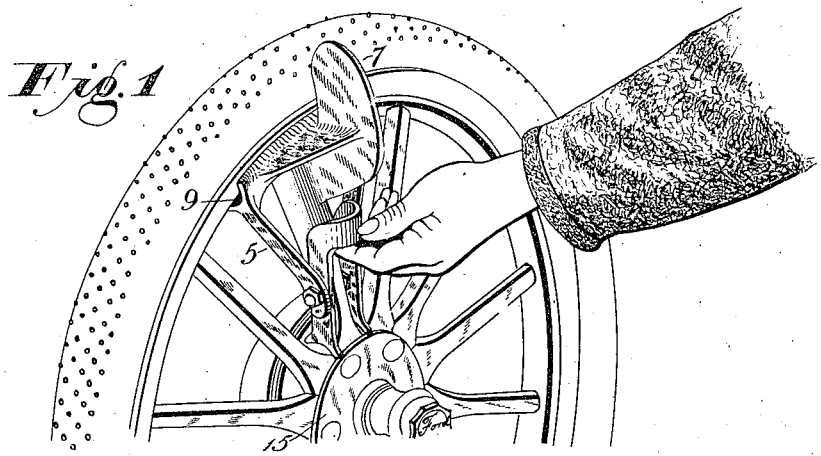
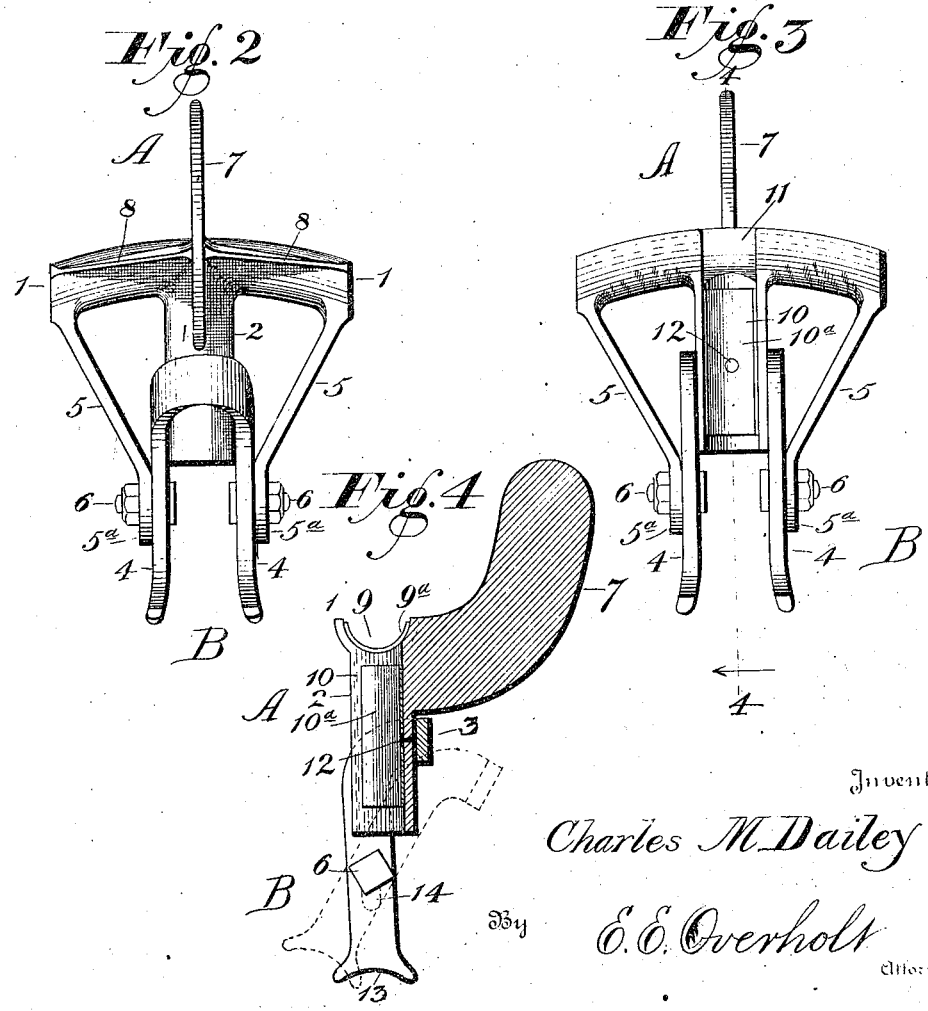
Inventor
Charles M. Dailey
By E. E. Overholt
Attorney C. M. DAILEY.
MUD HOLE ATTACHMENT FOR AUTOMOBILES.
APPLICATION FILED MAR. 23, 1917.

1,235,557.

Patented Aug. 7, 1917.
2 SHEETS—SHEET 2.

Inventor
Charles M. Dailey
By E. E. Overholt
Attorney

UNITED STATES PATENT OFFICE.

CHARLES M. DAILEY, OF ALGONA, IOWA.

MUD-HOLE ATTACHMENT FOR AUTOMOBILES.

1,235,557.     Specification of Letters Patent.     Patented Aug. 7, 1917.

Application filed March 23, 1917. Serial No. 156,884.

*To all whom it may concern:*

Be it known that I, CHARLES M. DAILEY, a citizen of the United States, residing at Algona, in the county of Kossuth and State of Iowa, have invented certain new and useful Improvements in Mud-Hole Attachments for Automobiles, of which the following is a specification.

My invention relates to mud-hole attachments for automobiles.

My object is to provide a non-slipping device adapted to be attached to one or both of the driving wheels of an automobile to prevent the wheels from slipping when mud holes are encountered.

Another object is to provide a simple, inexpensive and durable device which can be easily and quickly attached to a wheel or detached therefrom; one formed of few parts not liable to get out of order, and so small and light that it can be conveniently carried in the machine, where it will always be at hand when needed.

Other objects will appear in the subjoined description.

The invention is embodied in a device formed of two parts adapted to be securely attached to the driving wheel of an automobile between the hub and the inner periphery of the rim and preferably also in engagement with one of the spokes of the wheel; the parts of the device being connected together in a manner to form a toggle joint adapted to be moved in one direction to secure the device on the wheel, and in the opposite direction to disengage it therefrom; and one part of the device being provided with a mud-engaging wing adapted to prevent the wheels from slipping and spinning around in a mud hole instead of driving the machine forward.

The invention consists in certain novel features of construction and arrangement of parts as will be hereinafter described and claimed; reference being had to the accompanying drawings, in which:—

Figure 1 is a perspective view showing the device as it appears when being disengaged from an automobile wheel.

Fig. 2 is a plan view showing the outer side of the device.

Fig. 3 is a plan view showing the inner side thereof.

Fig. 4 is a vertical section taken on the line 4—4 of Fig. 3, looking in the direction of the arrow.

Figure 5:
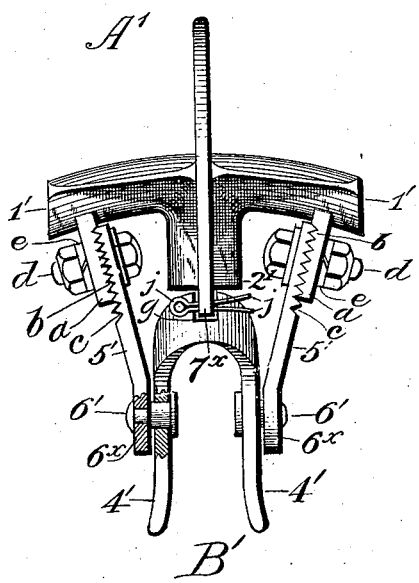
Fig. 5 is a plan view of a modified form of my device, the view showing the outer side of the device.
Figure 6:
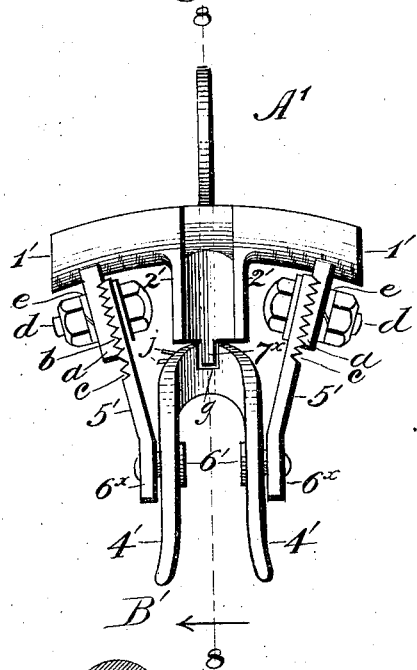
Fig. 6 is a plan view showing the inner side of the same.
Figure 7:
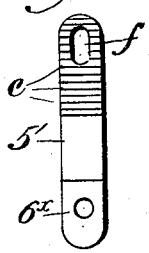
Fig. 7 is a plan view of one of the side braces used with the modified form of the device; and, Fig. 8 is a vertical section of Fig. 6, taken on the line 8—8, looking in the direction of the arrow.
Figure 8:
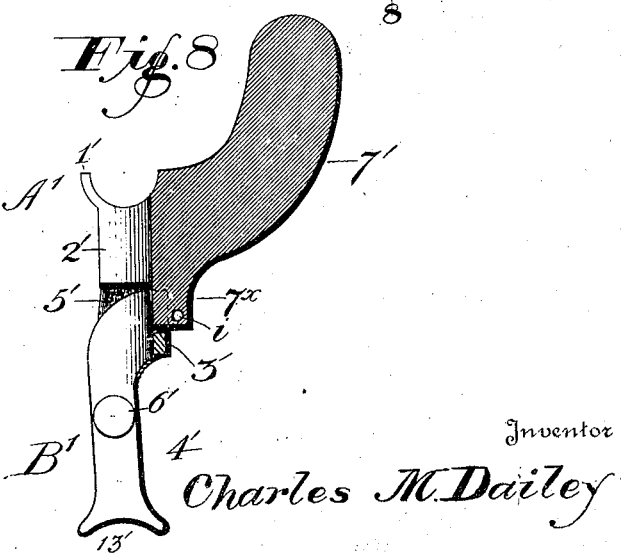

The device is formed of two parts, A and B, pivoted together: the portion A being the upper part, and the portion B the lower part, when the device is in the position shown in the drawings.

The part A comprises a body portion somewhat the shape of the letter T; the head 1 of the T, and the stem 2 thereof being integrally united together at the center of the head 1, and both being semicylindrical in cross section.

The part B of my device is formed from a U-shaped piece of metal with the curved end 3 of the U bent laterally till its two legs are brought into two planes approximately parallel with each other and at right angles to the plane which they originally occupied.

The T-head is provided at its outer ends with the braces 5 which incline inwardly toward each other till they come into engagement with the legs 4 of the part B at a point preferably beyond the free end of the stem 1 of the part A; the extreme outer ends 5ᵃ of the braces, after they reach the legs 4, being provided with registering apertures adapted to receive the short bolts 6 which form a pivotal connection between the two main parts A and B of my device.

At its outer end my device is provided with the mud-wing 7 formed integral with the sections 1 and 2 of the outer member A, and curving laterally outward from said sections and also extending beyond them. This wing 7 is disposed at a right angle to the general plane occupied by the rest of the device, and is braced by the mud-wing braces 8, which are shown in the drawings as integral flanges connecting the mud-wing 7 with the T-head 1 of the device.

The semi-cylindrical head 1 is curved to conform approximately to inner periphery of the rim of the wheel with which the device is to be used, and has its open side 9 in its outer periphery to receive said inner rim, as more clearly shown in Figs. 1 and 4.

The semi-cylindrical stem 2 of the T-shaped portion A is open on its inner side (as best shown at 10 in Figs. 3 and 4) to receive one of the spokes when the device is secured in operative position on the wheel.

As shown in Fig. 3, the inner wall of the T-head is cut away at 11 to permit the semi-cylindrical recesses of the head 1 and the stem 2 to merge into each other, just as the spoke and the rim of the wheel which they receive merge into each other at that point.

In order to prevent the rim of the wheel and the spokes from being scratched or otherwise defaced by forcible contact with the device, the recesses 9 and 10 of the part A may be provided with an inner lining or bushing of any soft yielding material, such as leather, rubber, felt, or the like. These bushings indicated by 9ª and 10ª (Figs. 3 and 4) are secured in their respective concave recesses 9 and 10 in any desired manner, as by the rivets 12.

When in operative position on the wheel, a spoke will be received between the two sides 4 of the part B of the device, and as the spokes are thickest at their base, the sides 4 are bent outwardly from each other at their extreme ends to make the space between them correspond to the greater thickness of the spokes at the hub of the wheel, while the extreme ends of said legs 4 are transversely concaved as at 13, to cause them to conform to the curvature of the spokes at their point of meeting each other.

The wider the legs 4 are at their lower ends, the less tendency will the part B of the device have to rock on the hub.

It has been stated above that the short bolts 6 pass through registering bores in the legs 4 and the ends 5ª of the braces 5; but instead of bores, slots may be provided if desired, in either or both of said parts, for purposes of adjustment; one such slot being indicated in dotted line at 14 in Fig. 4.

When the bolt 6 is in the lower end of the slot 14, (which is its normal position) the device will work exactly as it would do if there were only a bore there. But if it were desired to use the device on a wheel of greater diameter than the one for which it was primarily intended, then the slots 14 would permit the two parts A and B of the device to be suitably adjusted to compensate for the greater diameter of that wheel. When the device is in the desired operative position on a wheel, a turn of the nuts on the bolts 6 will lock the parts in rigid engagement with each other to hold the device securely on the wheel. This is a necessity when the device is used on a wheel of greater diameter than the one for which it was originally intended, and may be done at all times, with whatever sized wheels the device may be used, as a guarantee against accidental displacement of the device while in use.

The loop 3 which connects the upper ends of the two legs 4 together, permits the legs to move inwardly sufficiently to bring the bolt 6 slightly inside the plane passing centrally through the parts A and B, which practically locks the toggle joint formed by these two parts, so that even if the nuts of the bolts 6 are not tightened as indicated above, the joint will be practically locked anyhow against accidental outward movement, whenever in use on the wheel for which it was primarily intended.

In operation, it will be seen that placing the device on a wheel around a spoke, as shown in Fig. 1, and then pushing the loop 3 inwardly, will cause the device to forcibly engage the wheel between the inner periphery of the rim and the hub.

More than one of these devices may be placed on each wheel, if desired. If a wheel starts to slip in passing through a mud-hole, the mud-wings 7 will engage the earth at the side of the tire, and thus enable the wheel to propel the vehicle.

When it is desired to remove the device from the wheel, it is only necessary to move the loop 3 outwardly, as indicated in Fig. 1, which disengages the device from the wheel and permits its easy removal, till it is again needed for an emergency.

The modified form of the device illustrated in Figs. 5 to 8 only differs slightly in a few details from the other form. In this modified form, the upper T-shaped portion A' has its head 1' provided with inwardly extending ears $a$ having on their inner faces corrugations or teeth $b$; and the braces 5' are also provided on their outer ends with corresponding corrugations or teeth $c$ adapted to be held in adjusted engagement with the teeth $b$ by means of bolts $d$, which are preferably provided with nut-locks $e$.

The braces 5' are also provided at their upper ends with slots $f$, which adapts them for adjustment on the ears $a$ to lengthen or shorten the device and thus adapt it to wheels of different diameters. In this modified form of the device the stem 2' of the T-shaped member only extends downwardly to the upper end of the lower members B' of the device; and the upper curved end 3', of this lower member, is provided with a slot $g$ into which the lower projecting end 7ˣ of the mud wing 7' extends; and this projecting end 7ˣ is provided with an opening $i$ adapted to receive a fid $j$ which insures the parts A' and B' against accidental movement relatively to each other while the device is in operation on a wheel.

In this form of the device, the bolts 6' which connect the legs 4' of the lower member with the braces 5', are provided with shoulders 6× as shown in Fig. 5, against which shoulders the braces 5' abut, to prevent the braces from binding against the legs 4'.

At their outer ends the bolts 6' are preferably riveted to the braces 5' instead of being bolted thereto.

In this form of the invention, the spoke of the wheel embraced by the device, forms a stop for limiting the inward movement of the upper end 3' of the member B' of the device, and the fid $j$ prevents the outward movement of said end 3', when the device is in operative position on a drive wheel.

The inward movement of said upper end 3' of the member B' is also limited independently of the spoke of the wheel by reason of the fact that the bottom of the slot $g$ abuts against the extreme lower end 7× of the mud wing 7' when it is attempted to move the upper end of the part B' inward materially past its operative position.

Having now described the principles of my invention and shown a practical embodiment of the same, what I claim as new and desire to protect by Letters Patent is:—

1. A device of the character described, comprising an outer and an inner member adapted to contact with the rim and hub of a wheel respectively; and a toggle joint for bringing said members into forcible engagement with said parts of the wheel to hold the device on the wheel; said outer member being provided with anti-slipping means.

2. A device of the character described, comprising an outer and an inner member adapted to contact with the rim and hub of a wheel respectively on opposite sides of one of the spokes of the wheel; and a toggle joint for bringing said members into forcible engagement with the rim and hub of the wheel and for holding them against accidental displacement thereon; said outer member being provided with anti-slipping means.

3. A device of the character described, comprising an outer and an inner member adapted to contact with the rim and hub of a wheel on either side of one of the spokes thereof; a toggle joint opening and closing toward and from said spoke for adjusting said members into forcible engagement with the rim and hub and for releasing them therefrom; and means for locking said members in rigid engagement with each other in their adjusted position; said outer member being provided with anti-slipping means.

4. A device of the character described, comprising an outer member conforming to the curvature of the wheel and adapted to receive a portion of the rim on either side of one of the spokes of the wheel; an inner member adapted to contact with the hub of the wheel on both sides of said spoke; a toggle joint closing inwardly toward said spoke for adjusting said members into forcible engagement with the rim and hub of the wheel; and a stop for holding the toggle in its closed position on the wheel; said outer member being provided with anti-slipping means.

5. A device of the character described, comprising an outer member conforming to the curvature of the rim of the wheel and receiving one of the spokes and a portion of the rim at either side of said spoke; an inner member adapted to contact with the hub of the wheel on either side of said spoke; braces inclining inwardly toward each other from the outer ends of said outer member; pivots connecting the inner ends of said braces with the sides of the inner member at a point between its ends to permit said members to move relatively to each other to bring their outer ends nearer to or farther from each other, to adapt the device when said members are moved in one direction to be pressed into forcible engagement with the rim and hub of the wheel and to release it from the wheel when moved in the opposite direction; and a stop for limiting the relative movements of said members in the direction to lock the device on the wheel, said stop permitting said members to move in said direction to a point slightly past longitudinal alinement with each other, to cause the pressure exerted by the device on the wheel to lock the joint against backward movement; said outer member having anti-slipping means.

6. A device of the character described, comprising an outer member and an inner member adapted to contact respectively with the rim and hub of a wheel; and a toggle joint closing inwardly for bringing said members into forcible engagement with the rim and hub of the wheel with which they are to be used, the outer member having a projection or tongue and the inner member having a slot into which said tongue is received when the toggle is closed, said tongue having an opening and a removable pin therefor to form a positive stop to prevent the accidental opening of the toggle; said outer member of the device being provided with anti-slipping means.

7. A device of the character described, comprising an outer T-shaped member with the head of the T conforming approximately to the curvature of the rim of the wheel, both the head and the stem of the T being semi-cylindrical in cross section with the head having its open side on its outer periphery, and the stem being open on its inner side, the head being adapted to receive the inner periphery of the rim and the stem to receive one of the spokes of the wheel; an inner member having two parallel legs connected together at one end by a loop extending outwardly approximately at right angles to the legs, the T-shaped member having braces inclining inwardly from its outer ends into contact with said legs of the inner member at a point between the loop and the free ends of the legs of said inner U-shaped member, said legs and braces being provided at their point of meeting with registering apertures for pivotally connecting said parts together to form a toggle joint at said point of meeting, said toggle being adapted when pushed inwardly to press the two members of the device into forcible engagement with the rim and hub of the wheel; the loop connecting said legs of the inner member being adapted to engage the stem of the T and to form a stop for the toggle joint when moved inwardly into engagement with said stem, the position of said apertures relative to said loop being arranged to permit the joint of the toggle to move inwardly slightly beyond central longitudinal alinement of the two members of the joint when the loop is in engagement with said stem; and a braced mud-wing carried on said T head.

8. A device of the character described comprising an outer T-shaped member with the head of the T conforming approximately to the curvature of the rim of the wheel to be engaged, and adapted to receive the inner periphery of said rim; an inner member having connected legs adapted to engage the hub of the wheel, the T-shaped member having inwardly extending ears between its center and its ends; braces for connecting said ears and said connected legs, said braces being provided at one end with means for rigidly engaging said ears and for longitudinal adjustment thereon, and at the other end with means for pivotally engaging said legs between their ends to form a toggle joint at the point of meeting, said toggle being adapted when pushed inwardly to press the two adjusted members of the device into forcible engagement with the hub and rim of the wheel; and means for locking the toggle when the device is in operative position on the wheel.

In testimony whereof I affix my signature in the presence of two witnesses.

CHARLES M. DAILEY.

Witnesses:
  CARL FERGUSON,
  S. C. SEWARD.